United States Patent [19]
Zheng

[11] Patent Number: 5,489,244
[45] Date of Patent: Feb. 6, 1996

[54] CENTRIFUGAL PLANETARY FRICTION TRANSMISSION

[75] Inventor: Yue Zheng, Tianjin, China

[73] Assignee: Yunzao Li, Tianjin, China

[21] Appl. No.: 38,954

[22] Filed: Mar. 29, 1993

Related U.S. Application Data

[63] Continuation-in-part of Ser. No. 735,330, Jul. 24, 1991, abandoned.

[30] Foreign Application Priority Data

Jul. 25, 1990 [CN] China ................... 90104953

[51] Int. Cl.⁶ ..................... F16H 13/06; F16H 13/10
[52] U.S. Cl. ............... 475/183; 475/330; 475/341; 475/346
[58] Field of Search .................. 475/183, 195, 475/330, 341, 346; 384/547, 543, 546

[56] References Cited

U.S. PATENT DOCUMENTS

| | | | |
|---|---|---|---|
| 429,108 | 6/1890 | Allen | 74/443 |
| 1,370,080 | 3/1921 | Ahond | 475/193 |
| 1,613,749 | 1/1927 | Garrard | 475/188 |
| 1,782,756 | 11/1930 | Edmunds et al. | 475/195 |
| 1,811,921 | 6/1931 | Edmunds | 475/183 |
| 2,000,500 | 5/1935 | Turner | 475/267 |
| 2,495,470 | 1/1950 | Nardone | 476/33 |
| 2,745,298 | 5/1956 | Braunagel et al. | 475/183 |
| 3,494,222 | 2/1970 | Hirota et al. | 475/330 X |
| 3,524,362 | 8/1970 | Hugel | 74/640 |
| 3,889,554 | 6/1975 | Sinclair et al. | 475/197 |
| 4,043,216 | 8/1977 | Sheer | 475/341 X |
| 4,733,579 | 3/1988 | Lew | 475/166 |
| 4,841,810 | 6/1989 | Lew | 475/165 |
| 4,916,981 | 4/1990 | Suzuki et al. | 475/183 |
| 5,037,361 | 8/1991 | Takahashi | 475/195 |
| 5,238,459 | 8/1993 | Andre | 475/183 |

FOREIGN PATENT DOCUMENTS

| | | | |
|---|---|---|---|
| 1049544 | 12/1953 | France . | |
| 2599802 | 12/1987 | France . | |
| 1033475 | 8/1960 | Germany . | |
| 4005204 | 8/1990 | Germany | 475/330 |
| 58-65359 | 4/1983 | Japan . | |
| 60-18651 | 1/1985 | Japan . | |
| 220253 | 11/1985 | Japan | 475/183 |
| 516853 | 6/1976 | U.S.S.R. . | |
| 1534232 | 1/1990 | U.S.S.R. | 475/346 |
| 1726878 | 4/1992 | U.S.S.R. | 475/183 |
| 1744336 | 6/1992 | U.S.S.R. | 475/341 |
| 923508 | 4/1963 | United Kingdom . | |

*Primary Examiner*—Kholo Ta
*Attorney, Agent, or Firm*—Longacre & White

[57] ABSTRACT

A centrifugal planetary friction transmission comprising an input shaft, an output shaft, at least one planetary friction pulley set which is formed by three coaxially linked cylindrical external friction pulleys, and three internal pulleys. The friction forces acting on the planetary friction pulley set are mostly cancelled out by each other. According to the invention, the external friction pulleys only contact with the internal friction pulleys, and the normal pressure for producing the friction force for transmitting the torque is created by the centrifugal force of the external friction pulley set only and the transmission is a positive characteristic planetary transmission.

12 Claims, 3 Drawing Sheets

CENTRIFUGAL PLANETARY FRICTION TRANSMISSION

This application is a continuation-in-part of U.S. application Ser. No. 07/735,330 filed Jul. 24, 1991, now abandoned.

BACKGROUND OF THE INVENTION a) Field of the Invention

This invention relates to a friction drive, and more particularly to a centrifugal planetary transmission in which the centrifugal force is used as the normal pressure.

b) Background of the Invention

Friction drive transmissions have a series of advantages such as structural simplicity, machining ease, quiet and even operation, improved shock-resistance and overload protection, and infinitely speed-variable drive. On the other hand, conventional friction drives incur a number of drawbacks, i.e. increased wearing, increased heat generation, lower driving efficiently, inaccurate drive ratios and larger volume. These drawbacks serve to limit the use of friction drives as they cannot be used for continuous high power transmission. The basic problem resulting in the above drawbacks is that conventional friction transmissions rely on either point contact or line contact accompanied by geometric sliding. Moreover, the large compressive force required by large friction forces wear detrimentally on the supports, such as bearings and shafts.

A friction transmission which utilizes line contact without geometric sliding, and centrifugal force as a pressing force which does not act on the supporting system has a high driving efficiency, smaller volume (high power density), accurate drive ratio and can drive continuously with large power; while at the same time maintaining the inherent advantages of conventional friction transmissions.

In order to transmit large torque or power by a small transmission volume, French patent 2599802 (abbreviated hereafter as French '802) provides a transmission comprising an input shaft, an output shaft, a planetary friction roller set which is formed by three coaxially linked cylindrical external rollers, and three internal rollers. The external rollers rotate about an axis of the external friction roller set and orbit about an axis of the internal friction rollers, and the external friction rollers contact tightly with the internal friction rollers respectively.

However, the planetary friction rollers of French '802 also contact with three external friction rollers in addition to the three internal friction rollers, so that the support of the planetary friction rollers forms a hyperstatic support system according to theoretical mechanics. The number of constrained conditions therefore exceeds the instant invention by three, caused respectively by the three additional external friction rollers; some of which bear load and some of which bear no load. The arrangement taught by French '802, thus, results in an unbalanced load distribution and increased load on the planetary bearing.

In addition, the transmission according to French '802 lacks the transmission efficiency of the present invention because if the rollers (or pulleys) are of interference fit, they cannot effectively rotate, and if the rollers (or pulleys) are of loose fit, they are not subjected to elastic deformation and cannot transmit out the torque. Moreover, the error of the radius of curvature in the case of external friction contact is increased, thus resulting in insufficient contact strength.

OBJECT OF THE INVENTION

The object of the present invention is to provide a planetary friction transmission which resolves the problems existing in the prior art and can reduce the load on the planetary bearing without interfering with rotation or transmitting no torque.

In order to overcome the deficiencies existing in the prior art friction transmission, the present invention provides a centrifugal planetary friction transmission comprising an input shaft, an output member, and at least one planetary friction roller set which is formed by three coaxially linked cylindrical external friction rollers being supported in a rotatable manner on an external roller shaft. The external friction pulley set rotates about its axis and orbits about an axis of the internal friction rollers, and the external friction rollers contacts tightly with internal friction rollers respectively. Two external friction rollers at both ends of the planetary friction roller set have the same size and contact respectively with two immobile internal friction rollers which have symmetric structure and the same size with respect to each other. An external roller, located in the middle of the external friction rollers, contacts with a rotatable internal friction roller to enable friction forces acting on the planetary friction roller set to be substantially cancelled out by each other to greatly reduce loading on the planetary bearing. The output member of the friction transmission is attached to the rotatable internal friction pulleys. The transmission according to the invention is characterized by at least one rotating arm whereby the external friction roller set(s) is (are) supported on the arm(s) via the bearing(s), and the arm(s) is (are) attached to the input shaft such that:

the external friction rollers only receive the power transmitted from the rotating arm;

the external friction rollers only contact with the internal friction rollers;

the normal pressure for producing the friction force for transmitting the torque is created by the centrifugal force of the external friction roller set;

the transmission is a positive characteristic planetary transmission; and the transmission ratio i is given by $$i = \frac{\text{the rotative velocity of the rotating arm}}{\text{the output velocity}} = \frac{1}{1 - \frac{d_2 \cdot d_3}{d_1 \cdot d_4}}$$

where:

$d_1$ is the diameter of the external friction roller which contacts with the immobile internal friction roller;

$d_2$ is the diameter of the immobile internal friction roller;

$d_3$ is the diameter of the external friction roller which contacts with the rotatable internal friction roller; and $d_4$ is the diameter of the rotatable internal friction roller.

These and other advantages and features of the present invention will be apparent when reference is made to the following detailed description and accompanying drawings.

DETAILED DESCRIPTION OF THE PREFERRED EMBODIMENTS

Figure 1:
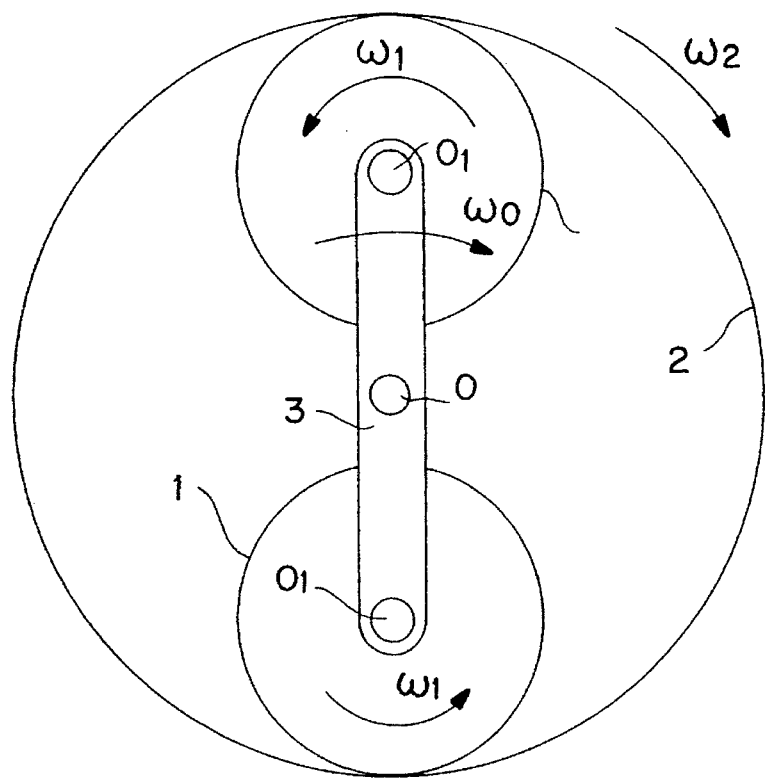
FIG. 1 is a schematic view illustrating the principle of the centrifugal planetary friction transmission.

A high speed rotating eccentric member may cause large centrifugal force. Prior art FIG. 1 shows the principle of the centrifugal planetary friction transmission. Planet friction rollers 1 are provided inside an internal friction roller 2 and contact the internal circumference thereof so that the centrifugal force of the planet rollers 1 is transferred to a normal pressure for internal contact friction. When the crank 3 drives the rollers 1 to rotate about the axle center O of the crank 3 at a high angular speed $w_o$, the rollers 1 rotate at an angular speed $w_1$ around the axle centers $O_1$ of the planet bearings, and roller 2 rotates at an angular speed $w_2$ around the axle center O. The relationship of the angular speed is as follows (in accordance with the direction of rotation shown in FIG. 1);

$$W_0 \times r_2 = W_1 \times r_1 + W_2 \times r_2$$

where $r_1$ and $r_2$ are radii of the rollers 1 and 2 respectively.

The above mentioned friction rollers are usually cylindrical friction rollers. In some specific cases, other kinds of friction rollers with slight geometry sliding may be used. The cylindrical friction rollers may obtain linear contact friction without geometry sliding because of their very small resilient sliding in the internal contact. The equilibrium between the centrifugal force and the normal pressure of the planet rollers frees the planet bearing from the loading caused by centrifugal force or normal pressure. Therefore, its drive efficiency is high.

When the rollers are made of metals, in particular, surface hardened cast iron, white cast iron or quenched steel, they can bear sufficiently allowable contact stress so that a large output moment of force is obtained. When the input angular speed $W_0$ is higher; hence obtaining large centrifugal force, the volume and weight of the entire transmission system may be so small that the system may have a large power density. The internal contact friction of the cylindrical friction rollers in which the resilient sliding is slight and the geometric sliding is absent may result in a more accurate and stable drive ratio. When the number of the planet rollers are increased and they are distributed uniformly, a dynamic balance may be easily reached and the system may operate evenly; moreover, the bearings for the input shaft and the output member are not forced, hence further increasing the driving efficiency.

In order to further increase driving efficiency, an axially symmetric structure may be adopted. That is, each planet roller set consists of three coaxial external friction rollers fixedly connected, wherein two external friction rollers at both ends engage respectively with two symmetrical immobile (or rotatable) internal friction rollers, and the middle external friction roller engages with a rotatable (or immobile) internal friction roller. Then, the direction of friction force on the planet roller applied by the internal friction roller at both ends is reversed to that applied by the middle internal friction roller. For the most part the friction forces are cancelled out by each other, only the difference between them acts on the planet roller. Accordingly, the load on the planet shaft is reduced greatly and the loss of bearing is also reduced, while the operating life of the bearing is increased by several times to ten times. This principle is also suitable to planetary gear transmission.

Figure 2:
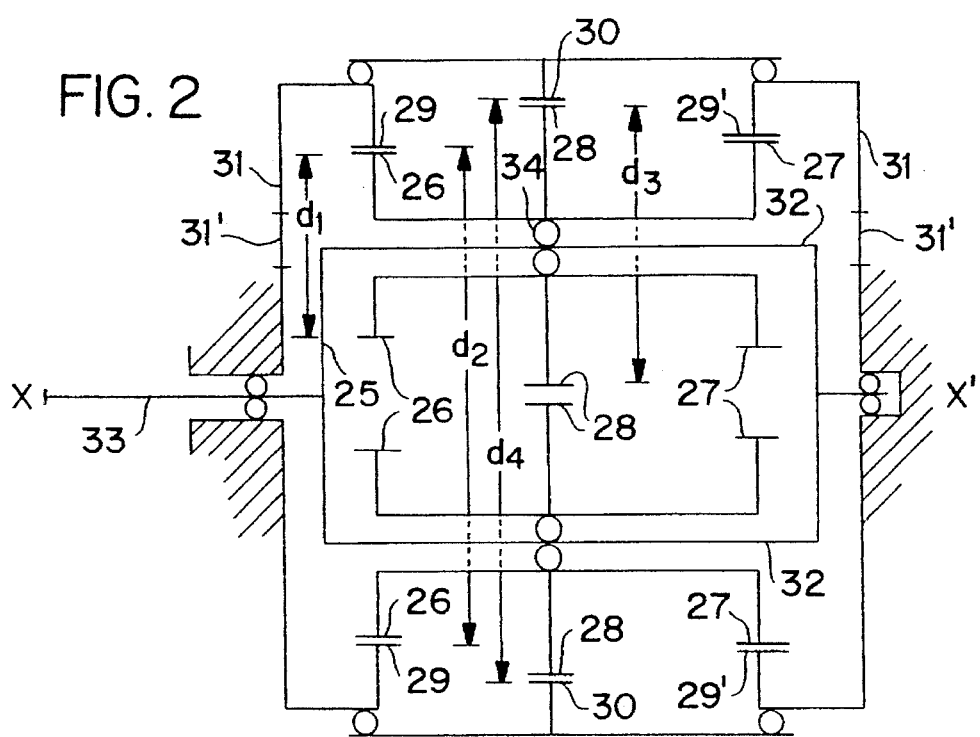
FIG. 2 is a schematic view of an embodiment of the centrifugal planetary friction transmission according to the invention.

FIG. 2 shows a basic structure applying this principle. As shown in FIG. 2, the centrifugal planetary friction transmission according to the invention comprises an input shaft 33, an output member 30, at least one planetary friction roller set 26, 28, 27 which formed by three coaxially linked cylindrical external friction rollers and three internal pulleys 29, 30, 29'. The input shaft 33 is attached to the carrier 32 of the planetary friction roller set 26, 28, 27 via a rotating arm 25 (or arms 25 in the case the transmission comprises several planetary friction roller sets). Driven by the input shaft 33 via the rotating arms 25, the planetary friction roller set 26, 28, 27 rotates about its axis and orbits about an axis x—x' of the internal friction rollers 29, 30, 29', and contacts tightly with the inner walls of the internal friction rollers 29, 30, 29'. The two external friction rollers 26, 27 at both ends of the planetary friction roller set have the same size, and contact respectively with two immobile internal friction rollers 29, 29' which have symmetric structure and the same size with respect to each other. An external roller in the middle of the external friction rollers contacts with the rotatable internal friction roller 30.

The friction forces from rollers 26, 27 have the same direction and value, which are opposite to the friction force from the external friction roller 28. That is to say, as shown in FIG. 2, if seen from the left side, the left and right external friction rollers 26, 27 rotate clockwise, and the forces of the immobile internal friction roller 29 acting on the external friction rollers 26, 27 direct out of the paper. The external friction roller 28, located in the middle of the triple planetary friction rollers, engages with the rotatable internal friction roller 30. The force that the rotatable internal friction roller 30 exerts on the external friction roller 28 directs into the paper. Therefore, most of the forces acting on the external friction rollers 26, 27 and acting on the external friction roller 28 are cancelled out by each other, and only minor differences between the friction forces act on the planetary bearing 34.

While French '802 discloses a transmission similar to the present invention, the following differences distinguish the invention over French '802:

1. the planetary friction rollers of the invention contact with three (only three) internal friction rollers, while the planetary friction rollers according to French '802 contact with three additional external friction rollers;

2. the planetary friction rollers of the invention uses centrifugal force produced by the rollers per se as the normal pressure for making the friction force. French '802, on the other hand, uses the compressive force, which acts on the planetary friction rollers resulting from the elastic deformation of the external friction rollers during fitting the planetary friction rollers with the internal friction pulleys and the external friction rollers as the normal pressure for making the friction force. The power is transmitted from the central friction rollers to the planetary friction rollers;

3. the principle of the planetary transmission is divided into two kinds: positive characteristic planetary transmission and negative characteristic planetary transmission. The planetary transmission according to the invention belongs to the former, and the planetary transmission according to French '802 belongs to the latter. Therefore, the transmission features (such as the formula for calculating transmission ratio) for each are totally different.

The ratio i of the transmission according to the invention is calculated as follows:

$$i = \frac{\text{the rotative velocity of the rotating arm}}{\text{the output velocity}} = \frac{1}{1 - \frac{d_2 \cdot d_3}{d_1 \cdot d_4}}$$

where:

$d_1$ is the diameter of the external friction roller which contacts with the immobile internal friction roller;

$d_2$ is the diameter of the immobile internal friction roller;

$d_3$ is the diameter of the external friction roller which contacts with the rotatable internal friction roller; and $d_4$ is the diameter of the rotatable internal friction roller.

Figure 4:
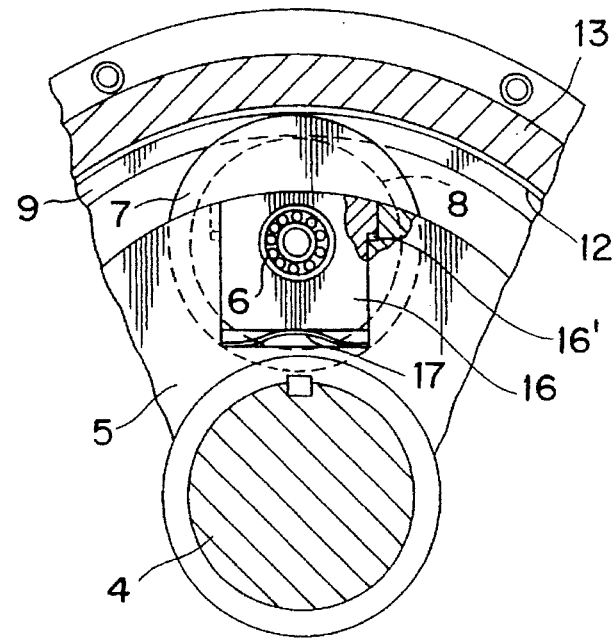
FIG. 4 shows a radially floating means provided in the transmission according to the invention.

A radially floating means which can make the planetary friction roller move radially and freely is an important part of the centrifugal planetary friction transmission according to the present invention. Its basic structure is a radially floating slide-block shown in FIG. 4. In FIG. 4, the reference numerals 12 and 9 are both internal friction rollers, 13 is a left housing, 5 is a rotating arm, 4 is the input shaft, 6 is a planetary bearing, and 7 is an external friction roller and its shaft. The outer ring of planet bearing 6 is fixedly positioned on the radially floating slide-block 16 which may only slide radially in the U-notch provided in the rotating arm 5. Lug 16' of slide-block 16 is engaged in the groove of the U-notch for axial location of the planet roller system. Through the spring 17, the planet friction rollers are still pressed against the inner wall of the internal friction roller under static condition to prevent the planetary rollers from striking against the internal friction rollers under effect of centrifugal force during starting. The spring 17 may also be used to increase the friction force.

There is another radially floating means in which some diameters of the mounted element are intentionally larger or less than the diameter of the supporting elements fitted. For example, the inner diameter of the planet roller is made slightly larger than the outer diameter of the planet bearing, or the outer diameter of the shaft of the planet roller is made slightly less than the inner diameter of the planet roller, or the outer diameter of the planet bearing is made slightly less than the inner diameter of the fulcrum holes of the rotating arm, even the planet bearing with larger clearance is used. Therefore, the radial floating of the planet rollers may be realized depending on the gap formed under the action of centrifugal force.

The radially floating means may also be formed through other ways, such as various types of mechanisms for load equalization of known planet transmissions, in particular, the resilience floating load equalization attained by using non-metal materials.

One of the design principles of the radially floating means is to make as much mass as possible float radially together with the planet rollers in order to reduce the weight of the system and increase friction force.

The utilization of the radially floating means may reach the following purposes: the wear of the friction roller may be compensated automatically, the load of the planet rollers in a system may be equalized automatically and uniformly, the drive structure may be made shockproof, the planet bearing may be freed from the action of radial contact partial force or centrifugal force and hence bring out the variable speed mode with changing central distance.

Figure 3:
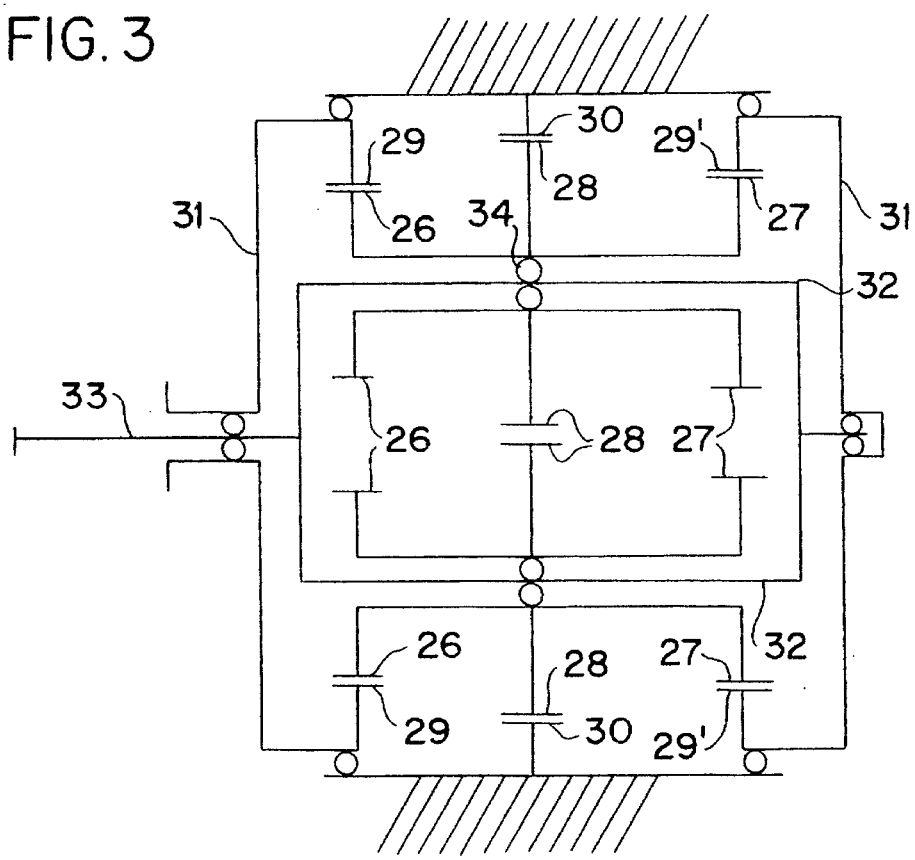
FIG. 3 is a second embodiment of the centrifugal planetary friction transmission according to the invention.
Figure 5:
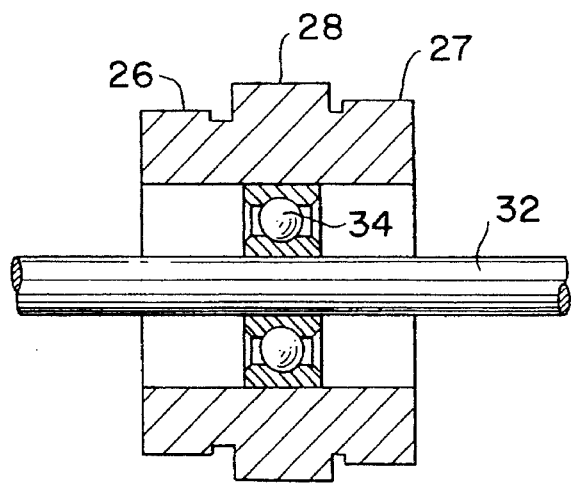
FIG. 5 shows a center-regulating global bearing used in the friction transmission according to this invention.

The transmission may have a plurality of triple planetary friction rollers distributed uniformly. Each triple planetary friction roller may use a center regulating global bearing 34 (FIG. 5) as a planet bearing. The bearing 34 is mounted on the middle of the inside of the planet roller set, as shown in FIG. 2. This makes the internal contact friction between the rollers 26 and 29, 27 and 29' at two sides of the planetary roller set enable automatic load equalization, and error in fabrication to be absorbed so as to keep excellent contact. At that time, the ends of the eccentric shaft 32 are connected fixedly with the axially floating sliding block. In correspondence with FIG. 2, a similar structure type, in which rotatable internal friction rollers are provided at both ends and the immobile internal friction rollers are formed in the middle, may be provided as shown in FIG. 3. In this case, the rotatable internal friction rollers at both ends are linked with a shaft which extends as an output shaft on which an input shaft like a sleeve fits and rotates. The power is laterally transmitted to the input shaft through a tapered gear, or leather belt, etc.

In order to keep the drive ratio constant after the internal contact friction roller pair (in particular, dry internal friction roller pair) is worn, the relationship between the wearing value $\Delta_1$ of the planet friction roller whose radius is $r_1$ and the wearing value $\Delta_2$ of the internal friction roller which engages therewith and has radius $r_2$ should be retained as follows:

$$\Delta_1/\Delta_2 = r_1/r_2$$

The planetary friction roller should be harder and the internal friction roller should be softer so as to let the wearing value be in accordance with the above proportion. In this case, even if the diameter of the roller is worn by micrometers, the drive ration can still remain constant. Because of the compensation of the radially floating means, the driving property remains constant, hence increasing greatly the operating life.

The centrifugal planetary friction transmission of this invention may also be used in a speed increasing transmission. In this case, the output member of the above mention apparatus becomes an input member, while the input member becomes an output shaft. To set up a normal pressure for friction force during starting, a strong spring is used as a pressing spring of the radially floating means (for example, spring 17 in FIG. 4), or an overrunning clutch is mounted additionally between the input shaft and the output shaft. During starting, the input shaft directly drives the output shaft through the overrunning clutch to make the planet pulley create centrifugal force and friction force. The friction force gives an acceleration for rotating the output shaft. When the rotating speed exceeds that of the input shaft, the overrunning clutch is disengaged, and the transmission enters into speed increasing operating mode.

In fact, the limiting factor for centrifugal planetary friction transmissions is heat-sinking capability rather than the problems of strength, gear line speed, and fabrication accuracy. However, the transmission of this invention can realize very high drive efficiency, hence reducing heat generation. Moreover, the steel friction roller can withstand higher operating temperatures. The housing does not require an exact seal because it has no oil or other liquid therein. Therefore, it is convenient to provide a blowing cooling into the housing. For example, on the input shaft in the housing, a fan blower may be mounted, or at both ends of the housing, a vent may be disposed respectively for ventilation (for example, vent 31' of FIG. 2).

Figure 6A:
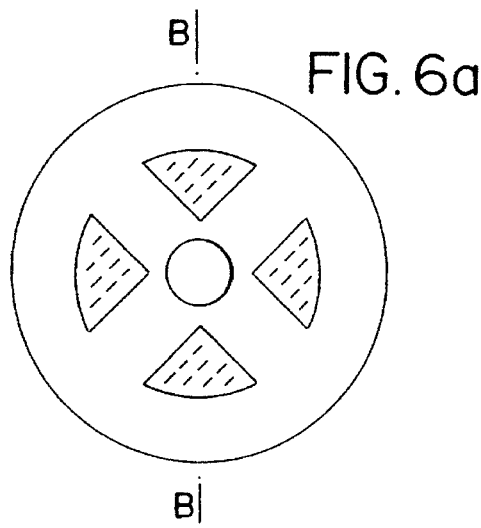
FIGS. 6a and 6b show an embodiment of a friction roller according to the invention which is hollow and filled with lead.
Figure 6B:
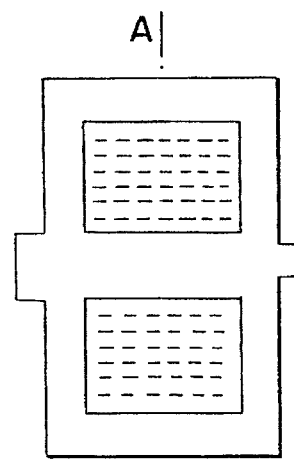

In order to further increase the power density, and in particular, to obtain large output torque under the condition of lower input rotational velocity, the following ways may be adopted in addition to known ways such as increasing friction force:

1. The steel planet rollers may be hollowed and a heavy metal such as lead whose density is more than 7.85/cm³ is poured into the cavities of the rollers so as to increase the centrifugal force of the planet rollers (see FIGS. 6a and 6b).

2. At least one friction roller pair may be replaced with a gear pair, and the center of gravity of the planet roller system may be made as close to the remaining friction roller pair as possible so that the centrifugal force is centralized on a few of the friction roller pairs.

Figure 7:
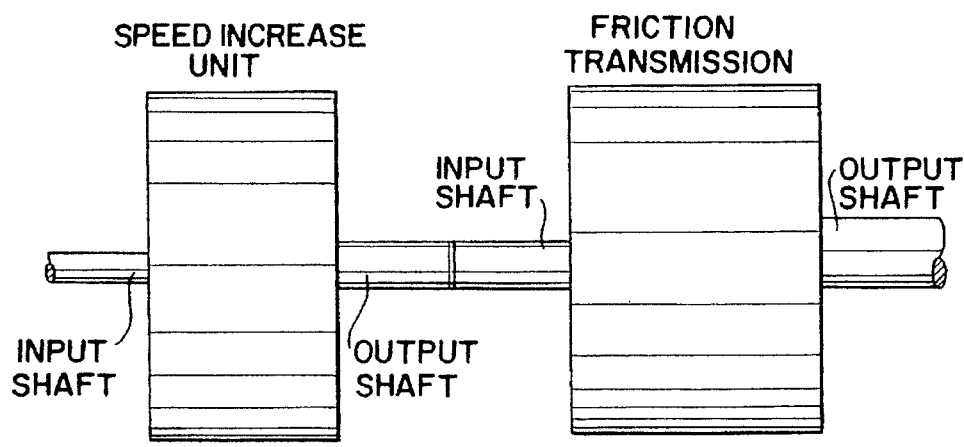
FIG. 7 shows an embodiment of a friction transmission according to the invention which is connected with a one stage speed increase unit.

3. One stage of a speed increasing unit may be added at the input end of the centrifugal planetary friction transmission (see FIG. 7).

The transmission according to the invention has the advantages of small volume, simple structure, and high driving efficiency. Moreover, the centrifugal planetary transmission of the instant invention has excellent starting properties. Since the friction force is set up or established gradually depending on arising rotating speed and increasing centrifugal force, and further has the property of the hydrodynamic clutch, the prime mover does not subject load during starting. Thus, the prime mover such as an electric motor has excellent starting characteristics under heavy load. To sum up, it can expected that in the high speed power transmission field, the centrifugal planetary friction transmission of the present invention will be substituted for conventional gear transmissions.

While the foregoing invention has been particularly shown and described with reference to preferred embodiments, it will be understood by those having ordinary skill in the art that various changes in form and detail may be made therein without departing from the spirit and scope of the invention.

I claim:

1. A centrifugal planetary friction transmission comprising an input shaft, an output member, at least one planetary friction roller set comprising two external friction rollers of the planetary friction roller set having same size, and contacting respectively with two immobile internal friction rollers which have symmetric structure and same size with respect to each other, and an external friction roller in between said external friction rollers contacting with a rotary internal friction roller to enable friction forces acting on said planetary friction roller set to be substantially cancelled out reduce loading on a planetary bearing means, the output member being attached to the rotary internal friction roller, wherein said transmission further comprises at least one rotating arm supporting said external friction rollers via the planetary bearing means, and said at least one arm is attached to the input shaft so that said external friction rollers receive only the power transmitted from the rotating arm, and said external friction rollers only contact with said internal friction rollers, and a normal pressure for producing the friction force for transmitting the torque is created by the centrifugal force of said external friction rollers, and wherein each of said external friction rollers rotate about its axis and orbit about an axis of the internal friction rollers.

2. A transmission as set forth in claim 1, wherein each said external friction rollers use a single center-regulating global bearing as said planetary bearing means, said global bearing mounted on a shaft of the planetary friction roller set.

3. A transmission as set forth in claim 1, further comprising a radially floating means for preventing said external friction rollers from striking against the internal friction rollers during starting.

4. A transmission as set forth in claim 1, wherein said external friction rollers are formed of steel, hollowed out and filled with a heavy metal such as lead whose density is more than 7.85 g/cm³.

5. A transmission as set forth in claim 1, wherein said input shaft of said transmission is drivingly connected to a one stage speed increasing means for increasing a rotating speed input to said input shaft.

6. A transmission as set forth in claim 1, wherein said external friction rollers are harder than said internal friction rollers contacted therewith and a ratio of wearing values of said rollers is substantially equal to the ratio of radii said rollers.

7. A transmission as set forth in claim 1, wherein said transmission defines a transmission ratio i given by $$i = \frac{\text{the rotative velocity of the rotating arm}}{\text{the output velocity}} = \frac{1}{1 - \frac{d_2 \cdot d_3}{d_1 \cdot d_4}}$$

and where:

$d_1$: the diameter of the two external friction rollers which contact with the immobile internal friction rollers;

$d_2$: the diameter of the immobile internal friction rollers;

$d_3$: the diameter of the external friction roller which contacts with the rotatable internal friction roller; and $d_4$: the diameter of the rotatable internal friction roller.

8. A centrifugal planetary friction transmission comprising an input shaft, an output member, at least one planetary friction roller set comprising two external friction rollers of the planetary friction roller set having same size, and contacting respectively with two rotary internal friction rollers which have symmetric structure and same size with respect to each other, an external friction roller in between said two external friction rollers contacting with an immobile internal friction roller to enable friction forces acting on said planetary friction roller set to be substantially cancelled out to reduce loading on a planetary bearing means, the output shaft being attached to the rotary internal friction rollers, wherein said transmission further comprises at least one rotating arm, said external friction rollers being supported on the at least one arm via the bearing means, and said at least one arm being attached to the input shaft so that said external friction rollers receive only the power transmitted from the at least one rotating arm, and said external friction rollers only contact with said internal friction rollers, and a normal pressure for producing the friction force for transmitting the torque is created by the centrifugal force of said external friction rollers, wherein each of said external friction rollers rotate about its axis and orbit about an axis of the internal friction rollers, and the external friction rollers contact with the internal friction rollers, respectively.

9. The transmission according to claim 8, further characterized in that said transmission has a transmission ratio such that $$i = \frac{\text{the rotative velocity of the rotating arm}}{\text{the output velocity}} = \frac{1}{1 - \frac{d_2 \cdot d_3}{d_1 \cdot d_4}}$$

where:

$d_1$: the diameter of the external friction pulley which contacts with the immobile internal friction roller;

$d_2$: the diameter of the immobile internal friction roller;

$d_3$: the diameter of the two external friction rollers which contact with the two rotatable internal friction rollers; and $d_4$: the diameter of the two rotatable internal friction rollers.

10. A centrifugal planetary friction transmission comprising:

an input shaft;

an output member; and at least one planetary friction roller set which is formed by three coaxially linked cylindrical external friction rollers and three internal rollers, each said external friction roller rotating about its axis and orbiting about an axis of the internal friction roller, and the external friction rollers contacting with internal friction rollers respectively;

wherein two external friction rollers at both ends of the planetary friction roller set have the same size, and contacting respectively with two immobile internal friction rollers which have symmetric structure and same size with respect to each other, and an external friction roller in between said external friction rollers contacting with said rotary internal friction roller for reduced loading on a planetary bearing means, the output member being attached to the rotatable internal friction rollers, wherein said transmission further comprises at least one rotating arm, each said external friction roller being supported on the arm via the bearing means, and said arm is attached to the input shaft so that said external friction rollers receive the power transmitted from the rotating arm.

11. The centrifugal planetary friction transmission according to claim 10, wherein said external friction rollers only contact with said internal friction rollers, and a normal pressure for producing the friction force for transmitting the torque is created by the centrifugal force of said external friction rollers.

12. The centrifugal planetary friction transmission according to claim 10, further having a transmission ratio i $$i = \frac{\text{the rotative velocity of the rotating arm}}{\text{the output velocity}} = \frac{1}{1 - \frac{d_2 \cdot d_3}{d_1 \cdot d_4}}$$

where:

$d_1$ is the diameter of the two external friction rollers which contact with the immobile internal friction rollers;

$d_2$ is the diameter of the immobile internal friction rollers;

$d_3$ is the diameter of the external friction roller which contacts with the rotatable internal friction roller; and $d_4$ is the diameter of the rotatable internal friction roller.

* * * * *